United States Patent [19]
Goade

[11] 3,777,627
[45] Dec. 11, 1973

[54] END CAP LOCKING MEANS FOR HYDRAULIC CYLINDERS AND METHOD

[75] Inventor: James C. Goade, Joliet, Ill.

[73] Assignee: Caterpillar Tractor Co., Peoria, Ill.

[22] Filed: Apr. 7, 1972

[21] Appl. No.: 242,101

[52] U.S. Cl.................................. 92/168, 92/171
[51] Int. Cl.......................... F16j 15/18, F16j 11/04
[58] Field of Search..................... 92/169, 170, 171, 92/165, 166, 167, 168

[56] References Cited
UNITED STATES PATENTS

| | | |
|---|---|---|
| 2,891,513 | 6/1959 | Fagge................................ 92/166 |
| 3,138,073 | 6/1964 | Whitehouse...................... 92/169 |
| 3,334,773 | 8/1967 | Bimba............................... 92/165 R |
| 3,559,540 | 2/1971 | Sheldon............................ 92/168 |

Primary Examiner—Paul E. Maslousky
Attorney—Paul S. Lempio et al.

[57] ABSTRACT

A hydraulic cylinder comprises a housing having an end cap threadably mounted on an end thereof. A cylindrical gland is closely fitted within the housing and end cap to transmit a locking force from a set screw, threadably mounted on the end cap, to diametrically opposed portions of the interengaging threads attaching the housing and end cap together.

8 Claims, 2 Drawing Figures

PATENTED DEC 11 1973  3,777,627
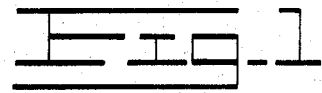
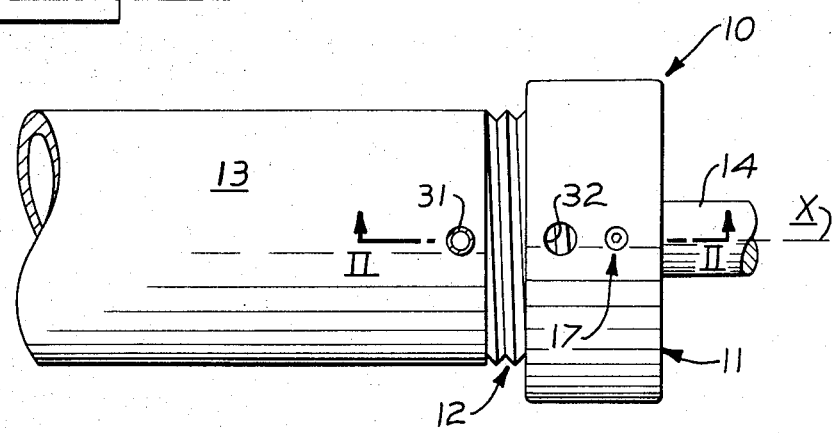
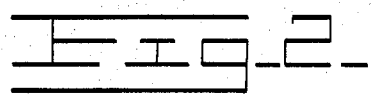
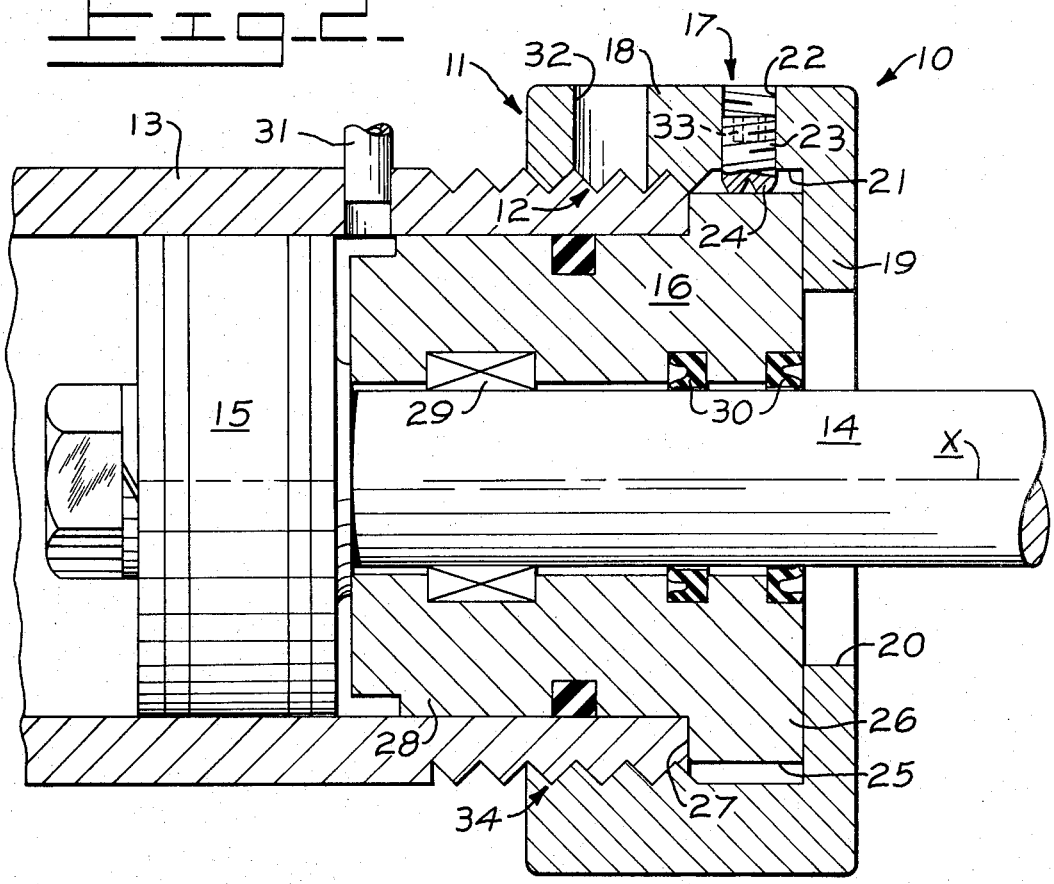

END CAP LOCKING MEANS FOR HYDRAULIC CYLINDERS AND METHOD

BACKGROUND OF THE INVENTION

This invention relates to locking means for locking threadably attached members in a fixed, axial position relative to each other. The locking means is particularly adapted for locking of an end cap on the housing of a hydraulic cylinder.

A recurring problem with respect to the assembly and disassembly of a hydraulic cylinder is one of providing reusable locking means for normally locking its end cap in position during cylinder operation and for permitting the end cap to be removed expeditiously for servicing purposes. One type of conventional locking means utilizes a pronounced interference fit between interengaged thread portions of the end cap and housing. For example, such interference fit may be achieved by suitably machining or deforming limited areas of the thread portions.

A common disadvantage thereof resides in the inability of such locking means to continuously resist axial displacement of the interengaging thread portions, resulting in the loosening of the end cap. The locking means also inhibits the expeditious attachment of the end cap on the housing and requires the application of a substantially high torquing force, by a wrench or the like, substantially throughout the entire axial length of the interengaging threads. Considerable time is thus required for assembly purposes, in contrast to the assembly of members having standard threads formed thereon which can be expeditiously interengaged by hand.

Set screws, threadably mounted in such end caps, have also been widely used to achieve such locking function by directly engaging underlying thread portions of a respective housing. In addition to deforming such thread portions, uncoupling of the members prior to disengagement of the set screw oftentimes results in the deformation and possible stripping of the threads formed on the housing.

SUMMARY AND OBJECTS OF THE INVENTION

Accordingly, an object of this invention is to provide an economical and reusable locking means for positively locking threadably attached members together to facilitate expeditious assembly and disassembly thereof and to assure that the interengaged threads will not be damaged should an attempt be made to disassemble the members prior to release of the locking means.

Another object of this invention is to mechanically induce a substantial interference fit at portions of the interengaging threads which are diametrically opposed to such locking means, via an intermedaite force transmitting means.

Another object of this invention is to employ such locking means to detachably secure an end cap on the housing of a hydraulic cylinder.

Other objects and advantages of this invention will become apparent upon reference to the following description and accompanying drawing.

BRIEF DESCRIPTION OF THE DRAWING

FIG. 1 is a side elevational view of the rod end of a double-acting hydraulic cylinder, embodying the present invention; and FIG. 2 is an enlarged, partially sectioned view, taken in the direction of arrows II—II in FIG. 1.

DESCRIPTION OF THE PREFERRED EMBODIMENT

Referring to the drawing, a double-acting hydraulic cylinder 10, disposed on a longitudinal axis X thereof, comprises an end cap 11 threadably mounted by interengaging, circumferential thread means 12 on the end of a cylindrical housing 13. The cylinder further comprises a rod 14 and attached piston 15, reciprocally mounted in the housing, and an annular sealing gland or force transmitting means 16 mounted on the rod within the housing and cap. Although force transmitting means 16 and a cooperating thread locking means 17 of this invention are herein described in association with a double-acting hydraulic cylinder, it should be understood that such means are adapted for use in other applications requiring the positive securance of two threaded members together.

The end cap comprises an annular portion 18 having a contiguous end flange 19 positioned thereon to abut gland 16 and to extend radially inwardly towards axis X. The flange defines a circular aperture 20 therethrough to accommodate reciprocation of rod 14. A recessed, circumferentially extending surface 21 is formed internally on the cap, between thread means 12 and flange 19.

The locking means comprises a radially disposed threaded hole 22, formed through the sidewall of the end cap to intersect surface 21. A setscrew 23 is threadably mounted in the hole and terminates at a cup point 24, formed on its lower end. The cup point normally engages an outer, circumferentially disposed surface 25 of a radially outwardly extending flange 26, formed on gland 16 to be concentric with respect to surface 21.

The gland further comprises a radially disposed surface 27 which abuts an end of housing 13 and a cylindrical portion 28 telescopically mounted in close fitting relationship within the housing. The rod is reciprocally mounted in an annular collar bearing 29 and axially spaced annular lip seals 30, each suitably mounted within a groove formed internally on the gland. The rod may be connected to any suitable work implement for actuating same upon selective extension or retraction of the rod.

Hydraulic fluid may be alternately introduced into and exhausted from closed chambers defined on either side of the piston by suitable lines, one of which is shown at 31, in a conventional manner. A spanner wrench or the like (not shown) may be used to engage an aperture 32, formed through annular portion 18 of the end cap, to tighten or loosen the cap on the housing. Alternatively, a standard chain wrench (not shown), preferably having a torque indicator associated therewith, can be suitably mounted on the cap to rotate same.

Once the end cap is threadably mounted on the housing under a torque of 350 ft. lb., for example, locking means 17 is actuated to prevent inadvertent removal of the end cap. The locking function is accomplished by engaging a hexagonal socket 33 of setscrew 23 with an allen wrench (not shown) to move the setscrew radially inwardly until cup point 24 thereof frictionally engages surface 25 of gland 16.

Further tightening of the setscrew will apply a radial load to the gland which functions as a force transmitting means to create a substantial interference fit at thread portions 34 of thread means 12 which are diametrically opposed to the location of the setscrew. Such interference fit will resist turning of the end cap relative to housing to prevent inadvertent loosening and disengagement thereof. In addition, should a serviceman fail to loosen setscrew 35 prior to his attempting to remove the end cap, threads 12 will not be damaged.

In view of the foregoing, it is readily apparent that this invention provides an economical and reusable locking means and method for threadably attached members which facilitates expeditious assembly and disassembly and continuously provides reliable retention of the threaded members together. While the invention has been described and shown with particular reference to the preferred embodiment, it is apparent that variations are possible that would fall within the scope of the present invention which is not intended to be limited except as defined in the following claims. For example, first threaded member 11 could comprise a standard nut suitably attached to second threaded member 13, such as a shank, and to force transmitting member 16 to form an attachment adapted for use in a wide variety of applications.

What is claimed is:

1. A hydraulic cylinder disposed on a longitudinal axis thereof comprising
   a housing,
   an end cap,
   circumferential thread means threadably mounting said end cap on an end of said housing,
   locking means operativelyy connected to said cylinder for indirectly applying a force to thread portions of said thread means to create a substantial interference fit thereat and
   force transmitting means, comprising a tubular member positioned between said locking means and said thread portions, for transmitting said force from said locking means to said thread portions, said thread portions being diametrically opposed to said locking means and said locking means being disposed on said cylinder to apply said force radially inwardly towards said axis and through said tubular member to said thread portions.

2. The invention of claim 1 wherein said hydraulic cylinder further comprises a piston and an attached rod reciprocally mounted in said housing, said rod extending through said end cap, and wherein said tubular member comprises a gland mounted within said housing and said end cap and having said rod reciprocally mounted therein.

3. The invention of claim 2 wherein said gland comprises a radial flange comprising a radially disposed surface abutting an end of said housing and a circumferentially disposed surface engaged by said locking means, said end cap having a radially disposed flange formed thereon abutting an end of said gland.

4. The invention of claim 1 wherein said locking means comprises a set screw threadably attached to said end cap.

5. A first member,
   a second member,
   circumferential thread means threadably mounting said first member on said second member to dispose them on a common, longitudinal axis,
   locking means connected to said first member for applying a force thereat, and
   force transmitting means comprising a tubular member positioned between said first and second members for transmitting the force applied by said locking means to thread portions of said thread means to create a substantial interference fit thereat, said thread portions being diametrically opposed to said locking means and said locking means being disposed on said first member to apply said force radially inwardly towards said axis and through said tubular member to said thread portions.

6. A threaded assembly comprising:
   a pair of threaded member, individually including threaded portions interconnectible in screw threaded relation and having a circumferential surface separate from their respective threaded portions;
   a tubular force transmitting member having a first portion telescopically disposed with respect to said circumferential surface of one of said threaded members and having a second portion telescopically disposed with respect to said circumferential surface of the other of said threaded members; and
   lock means, comprising a set screw threadably supported in one of said threaded members and threadably adjustable into and out of frictional engagement with said force transmitting member, in radial force transmitting relationship between the said one of said threaded members and said first portion of said force transmitting member to urge said second portion thereof into frictional engagement with said circumferential surface of said other of said threaded members at a point substantially diametrically opposite to said lock means to prevent unintentional relative rotation between said threaded members.

7. The threaded assembly of claim 6 wherein the pair of threaded members constitute the cylinder and end cap of a hydraulic jack.

8. The threaded assembly of claim 7 wherein the force transmitting member constitutes a bearing and seal gland, mounted in said cylinder, and including an annular flange disposed in locked position between an end of said cylinder and said end cap.

* * * * *